Aug. 20, 1929.  J. G. FUNK  1,725,512
KITCHEN UTENSIL LIFTER
Filed Feb. 26, 1927
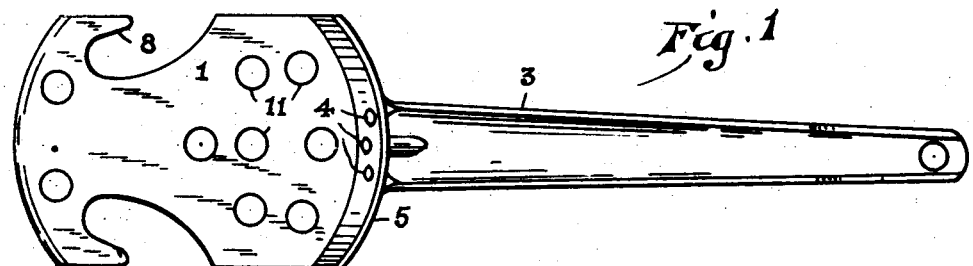
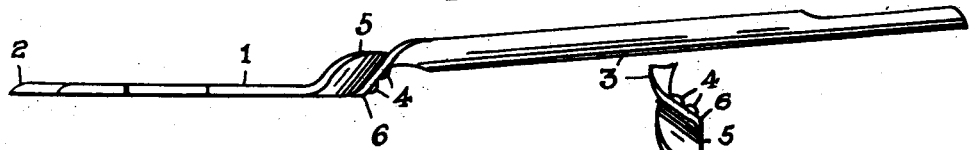
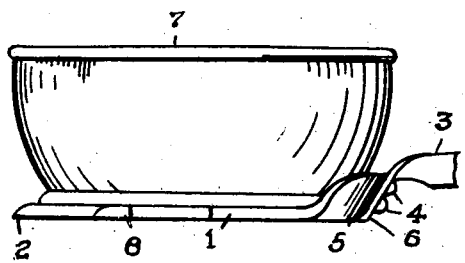
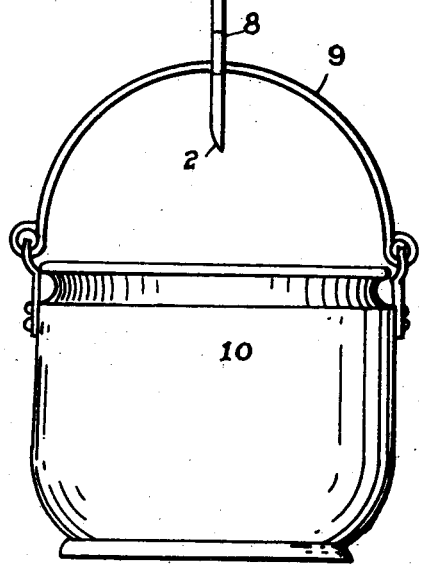
INVENTOR.
John G. Funk,
BY Edward A. Lawrence,
his ATTORNEY.

Patented Aug. 20, 1929.

1,725,512

UNITED STATES PATENT OFFICE.

JOHN G. FUNK, OF CLEVELAND, OHIO.

KITCHEN-UTENSIL LIFTER.

Application filed February 26, 1927. Serial No. 171,301.

The object which I have in view is the provision of a lifter for domestic and like use which may be employed for lifting grates, grids, cooking vessels, pots and pans, with or without bails, and the like.

In general, my improved lifter consists of a flat plate provided with a stout handle by means of which the plate may be slipped under bailless objects, such as referred to above, the front edge of the plate being relatively sharp to facilitate its insertion between a vessel and its support, such as the stove top or a table or sink. One or both side edges of the plate are notched to form hooks by means of which cooking vessels and the like may be lifted by means of their bails.

Other novel features of construction, and of arrangement of parts, will appear from the following description.

In the accompanying drawings, wherein I have illustrated the best embodiment of the principles of my invention now known to me, Fig. 1 is a plan view of my improved lifter; Fig. 2 is a side elevation of the same; Fig. 3 is a broken side elevation on reduced scale showing the lifter employed to lift a bailless cooking utensil, such as a glass casserole, and Fig. 4 is a similar view showing the lifter used for lifting a bailed cooking pot.

Referring to the drawings, the lifter is of the following characteristic construction, 1 is a metal plate which is flat, except as hereinafter explained, and has its forward edge beveled downwardly, as at 2, to produce a relatively sharp edge for insertion under a vessel as shown in Fig. 3. The front edge is also preferably rounded. Extending from the rear edge of the plate is the handle 3 which is preferably a separate piece of metal, and of arcuate cross-section, with the trough turned upwardly, to add strength and rigidity. The front end of the handle 3 is rigidly secured, as by nuts 4, to the rear of the plate 1. Preferably the curved rear edge of the plate 1 is bent upwardly to form an arcuate inclined flange 5 to the center of which the downwardly bent end 6 of the handle is attached. The flange 5 of the plate 1 forms a stop for the insertion of the plate 1 under a bailless cooking utensil, such as the casserole 7 in Fig. 3, the vessel being safely lifted with the free end plate 1 slightly tilted upwardly and the vessel bearing against the flange 5.

The manner of using the lifter with a bailless vessel is graphically illustrated in Fig. 3.

The side edges of the plate 1 are cut away to form the hooks 8 facing the handle end of the lifter, so that the lifter may be disposed vertically with its handle uppermost and one of the hooks 8 engaged with the bail 9 of a cooking pot 10, as shown in Fig. 4, for the purpose of lifting the pot.

The plate is preferably perforated, as shown at 11 in Fig. 1 to lessen the weight of the lifter and reduce the amount of metal required in its manufacture, and also for the further purpose of facilitating the cooling of the lifter by radiation.

My improved lifter is a great convenience, providing as it does a handy means for lifting and carrying kitchen utensils and like objects. It may be made and sold at relatively slight cost.

What I desire to claim is:—

1. A lifter for the purposes described comprising a flat plate portion adapted to be inserted under a vessel and having its rear provided with an upwardly extending limiting arcuate flange, said flat plate portion having an arcuate beveled forward edge to permit introduction of the plate portion under a vessel, the forward end of the plate being of the same width as the rear flange portion and a handle secured to said flange and extending rearwardly from the plate portion.

2. A lifter for the purposes described comprising a flat plate portion adapted to be inserted under a vessel and having its rear provided with an upwardly extending limiting flange, said flat plate portion having an arcuate beveled forward edge to permit introduction of the plate portion under a vessel, the forward end of the plate being of the same width as the rear flange portion and a handle extending rearwardly from the plate portion, the handle being raised above the plane of the plate portion.

3. A lifter for the purpose described comprising a flat plate having an upwardly extending limiting flange at its rear end, said flat plate portion having an arcuate beveled forward edge to permit ready introduction of the plate portion under a vessel, the forward end of the plate being of the same width as the rear flange portion, a handle portion extending rearwardly therefrom, and a hook carried by the plate portion for lifting vessels by their bails.

4. A lifter for the purpose described comprising a flat plate portion adapted to be inserted under a vessel and having its side edge cut away to form a hook for lifting vessels by their bails, the rear end of said plate having an upwardly extending arcuate flange and said plate having an arcuate beveled forward edge to permit ready introduction of the plate portion under a vessel and the forward end of the plate being of the same width as the rear flange portion and a handle portion extending rearwardly from the plate portion.

Signed at Cleveland, Ohio this 21st day of Feby. 1927.

JOHN G. FUNK.